Oct. 15, 1963  J. PARSTORFER  3,106,834
IMPACT SHOCK TESTING APPARATUS
Filed March 31, 1960  2 Sheets-Sheet 1
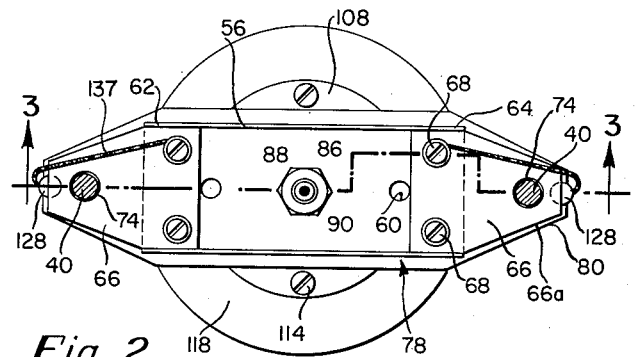
Fig. 2
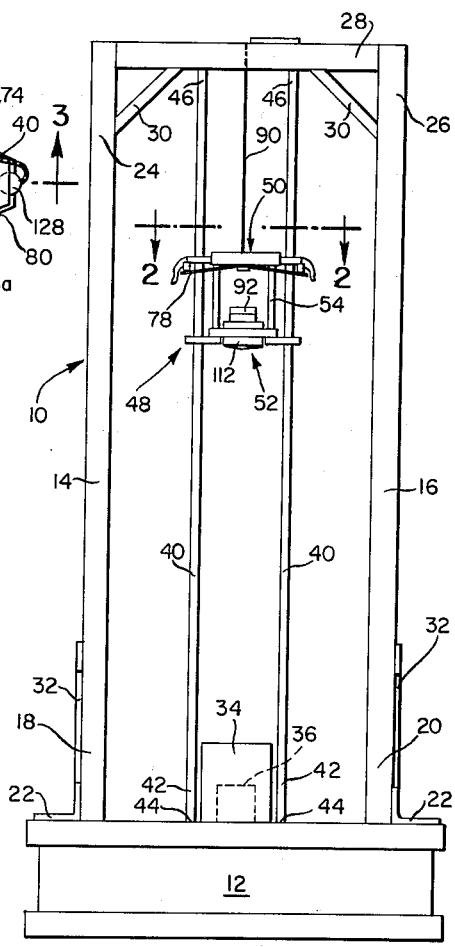
Fig. 1
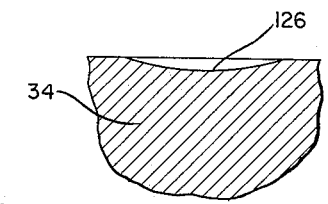
Fig. 8
Fig. 7
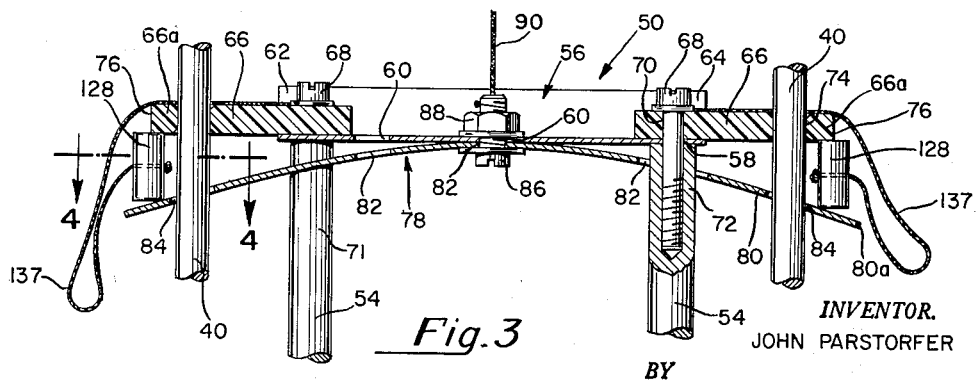
Fig. 3
INVENTOR.
JOHN PARSTORFER
BY
Carl Fissell Jr
AGENT

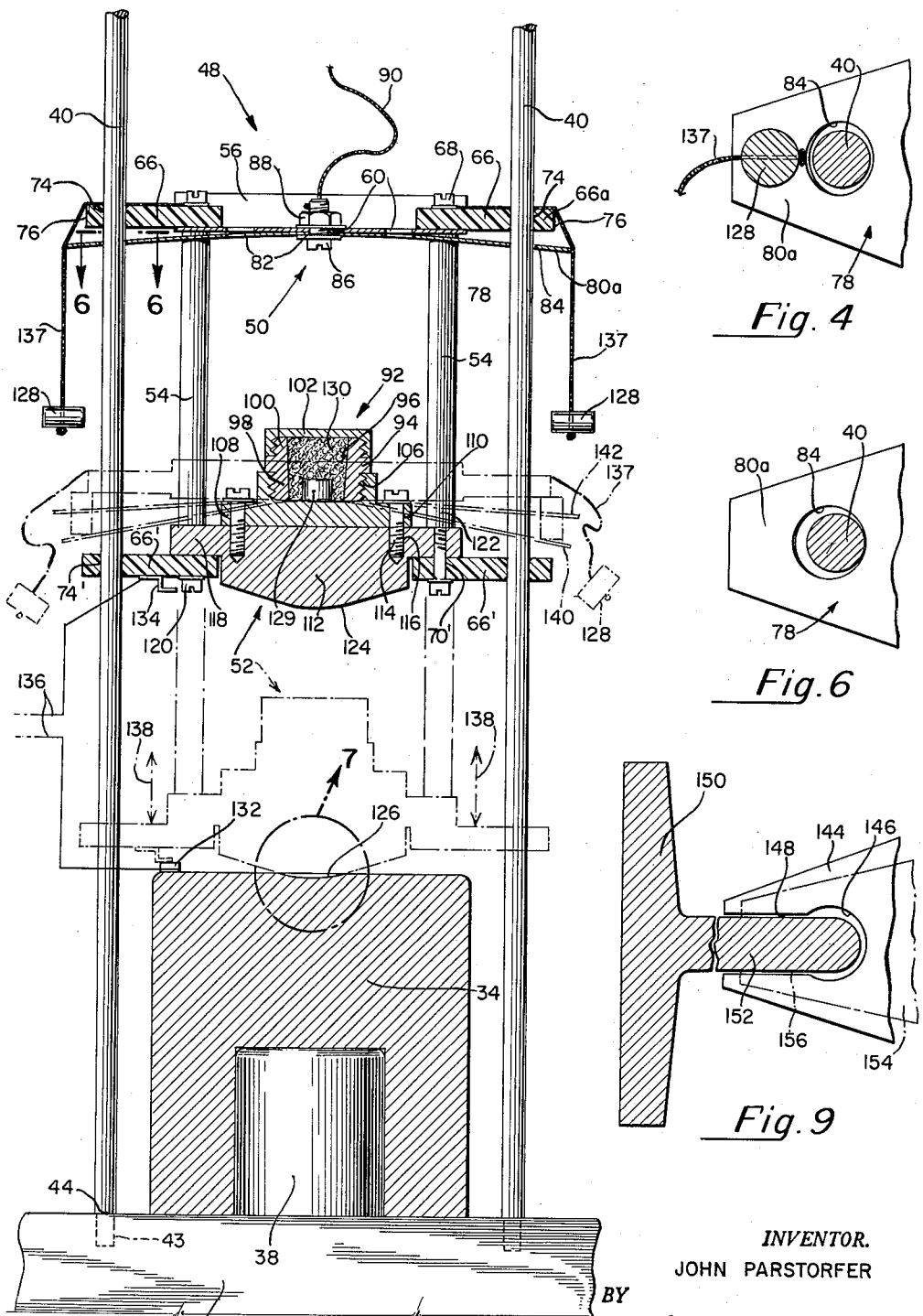

United States Patent Office 3,106,834
Patented Oct. 15, 1963

3,106,834
IMPACT SHOCK TESTING APPARATUS
John Parstorfer, Philadelphia, Pa., assignor to Burroughs Corporation, Detroit, Mich., a corporation of Michigan
Filed Mar. 31, 1960, Ser. No. 19,077
6 Claims. (Cl. 73—12)

The present invention relates to testing apparatus and more particularly to impact shock testing. With still more particularity, the invention has to do with apparatus for determining the ability of a test specimen to withstand relatively high impact forces in the order of several thousand times the force of gravity and to apparatus for preventing repetitive rebound of a shock testing carriage after the primary impact thus to avoid erroneous impact force indications.

It is well known in the art to permit a weighted test piece carrier member to drop from a predetermined height onto a fixed surface and through the means of electrical or mechanical transducers measure the result of the forces acting on the subject under test. Prior art apparatus includes those of the type wherein a plunger is dropped through a calibrated tube and wherein a clutch mechanism is provided to stop the plunger at the maximum height of its rebound. The clutch mechanisms used, generally include such devices as ball bearings, ratchet gears or the like, do not stop the apparatus at the peak of the rebound and often submit the test specimen to an uncontrollable jerking stop. In general these arrangements have given erratic, impositive results and for the most part have proved unsatisfactory.

It is an important object of the present apparatus to provide a simple inexpensive and fool-proof shock rebound peak stop means for the carriage of a shock testing apparatus.

It is an additional object of the invention to provide a rebound stop means for a shock tester which is positive and provides an abrupt, bounceless stop.

In accordance with the foregoing objects and first briefly described the invention comprises a tester carriage slidably constrained for movement between parallel guide members and including a specimen carrier and an impact member and wherein a slidably disposed rebound stop member carried by the carriage is laterally deflectable upon impact of the impact member with an anvil striking member thus to frictionally engage the stop member with the guide members and abruptly terminate the movement of the carriage at the peak of its rebound from the anvil.

Other objects and features of novelty of the invention will be specifically pointed out, or will become apparent when referring, for a better understanding of the invention, to the following description taken in conjunction with the accompanying drawings in which:

FIG. 1 is a side elevational view of the impact shock testing apparatus embodying the present invention;

FIG. 2 is a top plan view of the rebound stop mechanism of the present invention, the view being taken along the line 2—2 of FIG. 1;

FIG. 3 is an enlarged side elevational view, partially in section, of the mechanism of FIG. 2, the view being taken along the line 3—3 of FIG. 2;

FIG. 4 is an enlarged detail view along the line 4—4 of FIG. 3 illustrating the free fall position of the shock tester carriage;

FIG. 5 is an enlarged side elevational view of the apparatus of FIG. 1 illustrating the mechanism in its impact and rebound positions respectively;

FIG. 6 is a detailed view taken along the line 6—6 of FIG. 5 illustrating the rebound spring in its stopped position;

FIG. 7 is an enlarged detailed sectional view of the area encircled in FIG. 5;

FIG. 8 is an enlarged sectional view of the specimen carrier of the present invention; and FIG. 9 is an enlarged sectional view of a modified braking mechanism for the present invention.

A preferred embodiment of an impact shock tester 10 in accordance with the present invention is seen in FIG. 1 to comprise a substantially rigid weighted base 12 e.g., of cast iron or steel, forming a shock and impact absorbing platform, for purposes to be explained herein shortly. A rectangular drop test frame for the impact tester 10 includes oppositely disposed, upstanding, parallel, spaced apart, rigid, channel members 14 and 16, attached to the base 12 at their lower ends 18 and 20 respectively, as by being welded or bolted to respective transverse angle or flanged members 22 likewise bolted or welded thereto. The upper ends 24 and 26 of the corresponding channel members 14 and 16 are joined to opposite ends of a cross frame member 28, as by being bolted thereto. Angularly disposed gussets 30 are attached at one of their opposite ends to the cross frame member 28 and at their other ends to the ends 24 and 26 of the upstanding channel members 14 and 16 respectively, further rigidifying the entire test frame structure. Extending angularly downwardly toward the rear of the assembly are additional channel members 32—32 each being attached at one end to respective upstanding frame members 14 and 16 and at their rear depending ends to the base 12.

An anvil head providing a relatively hard striking surface for the impact tester comprises a short cylindrical member 34 disposed on the base or platform 12 and projecting vertically upwardly a slight distance therefrom. The anvil head may be attached to the platform or base in any suitable manner, as by bolts, not shown, or it may be provided with a cylindrical interior recess or bore 36 extending upwardly into the bottom thereof into which an upstanding post or pillar 38 integral with the base 12, FIG. 5, is received in press-fitted relation.

Oppositely disposed, parallel, spaced apart guide rods or bars 40, the lower ends 42 of which straddle the anvil head 34, extend vertically upwardly from the base 12 from tapped apertures into which the threaded undercut end 43 of the shank of each rod may be threadedly received so as to rest on a shoulder 44 formed adjacent the undercut end of each of the rods. The upper end 46 of each rod 40 is fixed to the cross frame 28 of the supporting structure, thus tending to further rigidify the overall assembly.

Disposed for vertical sliding motion up and down along the guide rods 40—40 is an impact shock tester carriage 48. The carriage 48 comprises an upper assembly 50 and a lower assembly 52, the two assemblies being disposed in vertical spaced apart relation by means of assembly rods 54 to which both assemblies are attached, in a manner to be described in detail hereinafter.

The upper assembly 50 includes a rectangular channel shaped bracket 56 FIGS. 2 and 3, of relatively rigid material such as stainless steel, provided with pairs of openings 58 at opposite ends thereof. Three substantially equi-distantly spaced openings 60 are located along the longitudinal center line of the bracket 56 for purposes hereinafter set forth.

At each of the opposite ends 62 and 64 of bracket 56 there is provided a truncated wedge-shaped guide plate member 66, a major portion of each extending laterally away therefrom. The members 66 are attached and supported on the bracket 56 as by bolts 68 passing through openings 70 in the members 66, the openings 58 in the opposite ends of the bracket 56 and threaded into the upper ends 72 of the rods 54. The outer unsupported end 66a of each member 66 is provided with an aperture 74 adjacent the truncated portions 76 thereof and concentric with and slidable along an associated guide rod 40.

A rebound stop spring member 78, for the shock tester 10, comprises a substantially rectangular, relatively thin, elongated, flexible member having oppositely disposed truncated wedge-shaped end portions 80, similar in configuration to that of the truncated wedge-shaped guide plates 66. The spring member 78 may be fabricated of light-weight material e.g., spring metal, plastic or fibreglass. One excellent material from which the spring of the preferred embodiment hereindescribed was made is glass epoxy laminate, approximately one-sixteenth of an inch in thickness. The spring member 78 is provided with a plurality of central apertures 82 disposed therein in a rectangular pattern concentric with the apertures 58 and 60 in the bracket 56 and in registry therewith when the spring is introduced into the upper assembly 50.

For reasons which will become more apparent hereinafter, each of the opposite wedge-shaped portions 80 of the spring 78 is provided with an aperture 84, FIG. 3, of slightly larger diameter than the apertures 74 in the guide plates 66. Additionally, the centers of the apertures 84 are longitudinally displaced approximately one-eighth of an inch in a direction toward the truncated end 80a of the spring member relative to the center of the apertures 74 in the guide plates 66.

The spring member 78 is mounted to the bracket 56 by means of a bolt 86 disposed through the center openings 60 and 82 in members 56 and 78 respectively and secured together as by a nut 88 threaded thereover. The end of the bolt 86 is or may be perforated, as by drilling, to provide means for the attachment thereto of a supporting cord or cable 90.

The lower assembly 52 includes a specimen carrier 92, FIGS. 5 and 8, having a central substantially cylindrical specimen carrying ring member 94 provided with a wedge-shaped interior bore 96 for purposes to be explained later on, and including oppositely disposed externally threaded ends 98 and 100. A threaded substantially circular cap 102 forms a top closure member for the threaded end 100 of the carrier ring 94. A circular shock base supporting member 104 including an internally threaded open end 106 and provided with an enlarged radial flange 108 forms a bottom closure member for the opposite threaded end 98 of the specimen ring 94 when threadedly engaged therewith. The radial flange 108 is drilled or otherwise provided with a plurality of circularly spaced apertures or openings 110, for purposes now to be described.

Attached to the flange 108 of the member 104 is an impact disc member 112 secured thereto as by bolts 114 threaded into the openings 116 in the latter member. The impact disc member 112, including a peripheral flange 118 surrounding the base thereof, is provided with a plurality of openings (not shown) therein for registry with the openings 70' in the guide plates 66'. The lower assembly 52 is attached by means of bolts 120 passing through the openings 70' in the members 66' and through the aforementioned openings (not shown) in the flange 108 of the impact discs 112 into the threaded lower ends 122 of the assembly rods 54. The projecting portion 124 of the impact disc is dome-shaped thus to provide a relatively small striking area or face for impact engagement with the anvil head 34.

It is noted in this connection that the striking surface 126 of the anvil head 34 may be slightly arcuately deformed as seen in FIGS. 5 and 7 thereby to provide a uniform mating seat for the shaped end 124 of the impact member 112, upon impact engagement therebetween. The effect of the impacts over a period of time is to work harden the surface of the anvil.

In order to maintain the spring member 78 freely, slidably movable vertically along the guide members 40, oppositely disposed wedging members, such for example as the short cylindrical rods 128, secured to the upper assembly as by cords 137, are, as seen in FIGS. 3 and 5, detachably positionable between the outer projecting ends 80 of the spring member 78 and the respective ends 66a of the guide plates 66. The spring member 78 is thereby longitudinally bowed and arcuately bent about its fixed center i.e., the attachment bolt and nut 86 and 88 into a position such that the center of each of the oversize holes 84 in each end of the spring member is substantially concentric with the rods 40, FIG. 4, thus permitting the carriage to slide freely up and down therealong.

Prior to a testing operation and with the wedges 128 in position, FIG. 3, the carriage 48 is hoisted by its cable 90 to a desired position along the guide rods 40, after which the cable 90 is releasably secured to cross frame 28 in a suitable manner. A specimen 129, FIGS. 5 and 8, is loaded into the specimen ring 92 and glued or otherwise suitably attached therein after which shock absorbent material 130 is placed therearound and the specimen carrier 92 is then tightly sealed as by screwing the cap 102 down onto the ring member 94.

Shock, strain or impact registering transducers may be carried by the specimen carrier for registering suitable outputs indicating shock, strain, impact etc. Or, as in the preferred embodiment, hereindescribed, and as shown in FIG. 5, a first switch contact 132 may be disposed on the anvil head 34 while a second switch contact member 134 may be disposed on the lower assembly 52. Electrically conductive leads 136—136 extend from the respective contacts to suitable indicating equipment such as an oscilloscope, not shown, whereby at the moment of impact the switch contacts are automatically closed. Closure of these contacts 132 and 134 may be utilized as a means for triggering the indicating circuits of the aforementioned oscilloscope or other indicating apparatus thereby providing means for determining the amount of force, for example, the number of g's produced at the instant of impact of the carrier with the anvil head 34. After the carriage 48 is located with its test specimen the wedges 128 are placed between the upper guide plates and the rebound spring member 78 deflecting the opposite ends of the spring arcuately downwardly, FIG. 3.

As seen in FIG. 4, the angular relation between the ends of the guide plates 66 and the ends of the rebound spring 78, i.e., lateral downward bowing caused by the wedges therebetween, permits the carriage 48 to be freely slidable along the rods 40. Release of the carriage as by releasing or severing the cable 90, FIG. 5, allows the carriage to drop by gravity causing the impact disc 112 to strike the anvil head 34, as shown in the dotted outline, FIG. 5. At the instant of impact the wedges 128 continue in their downward flight, their mass, i.e., weight, flexing the already bowed spring ends sufficiently to automatically release the wedges which fly out from between the guide plates and the ends of the spring and are thereafter retained by the cables 137. The carriage now rebounds from the anvil 34 as indicated by arrows 138 at opposite sides of the carriage, FIG. 5. Substantially instantaneously with the foregoing the unrestrained spring ends flex back from the dotted line position 140, FIG. 5, to the position shown in dotted outline at 142 wherein the inner edges of the openings 84 frictionally engage the sides of the rods 40 as shown in FIG. 6. The rebounding carriage 48 is now in flight upwardly along the guide rods 40, the spring ends offering sufficient friction against rods 40 to finally slow the carriage 48 which after exhausting its upward momentum comes to a complete stop. Gravity now operates on the mass of the carriage 48 and attempts to pull it back down along the guide rods 40 toward the anvil 34. However, at the instant the carriage reaches the peak of its upward travel the weight of the carriage wedges the ends of the spring 78, FIG. 5, against the guide rods 40 with such force that the carriage comes to a complete stop with the edges of the openings 84 jammed into tight contact with the rods 40 as shown at 142 in FIG. 5, holding the carriage at the uppermost point in its upward travel along the rods 40.

It should be apparent from the foregoing that the members 66 in addition to functioning as rectilinear guides for the carriage 48 also prevent the rods 40 from being bowed or bent laterally outwardly away from each other when the spring member 78 frictionally engages the rods 40 to stop the carriage. Consequently, if one or the other end of the spring 78 should fracture or break during operation of the testing apparatus, the opposite unbroken spring end is still able to stop the carriage. Neither the height of the drop nor the height of the rebound have any appreciable influence on the efficiency of the operation of the rebound peak stop spring 78.

At the instant of impact between the carriage 48 and the anvil 34 the switch contacts 132—134 close permitting a calculation to be made of the time during which the carriage 48 actually remained in contact with the anvil 34 until it rebounds back upwardly along the guide rods 40. The time interval in fractions of seconds can then be utilized to measure the impact force or g's thus indicating the amount of force operating upon the specimen 129 under study.

As seen in FIG. 8, the wedge or frusto-conical shape of the interior bore 96 of the specimen carrier 92 prevents the resilient shock absorbent and specimen protecting material 130 packed inside thereof from collapsing around and against the specimen 129 under test due to the intense pressure forces 131, FIG. 8, built up when the carriage impact member 112 strikes the anvil head 34.

In FIG. 9 there is shown a simpler and more rigid version of the present invention wherein a modified form of rebound spring 144 includes a circular aperture 146 and an elongated slot 148 opening laterally outwardly from the aperture 146 toward the unsupported end of the spring. The frame members 14, 16, 28, 32 and the rods 40 are replaced by T-shaped guide members 150 each having a central projection forming a rail 152 extending the length thereof. The guide members 150 may be secured to the base in any suitable fashion as by bolts or welding, not shown. The slotted ends of the spring 144 are thus adapted to be frictionally engaged with the rails 152. Modified guide plates 154 are likewise provided with slotted ends 156 in the manner of the spring member 144.

The modified spring and guide plates operate substantially in the same manner as the spring 78 and guide plates 66 so that with suitable wedges, not shown, separatingly placed between the guide plates 154 and the spring 144 and with the carriage disposed at a suitable distance above the anvil gravity will move the latter downwardly along the rails 152. When the carriage 48 strikes the anvil head 34 the wedges pop out of engagement between the guides 154 and the spring 144, as before, so that at the peak of the carriage rebound, the inner edges of the openings 146 engage and jam the spring against the rails 152 abruptly stopping the movement of the carriage, thus preventing any additional carriage rebound. The T-shaped guides 150 are of sufficient rigidity that there is no lateral bowing or separation therebetween as a result of the frictional engagement of the spring 144 with the rails 152 in stopping the carriage.

What is claimed is:

1. Impact shock testing apparatus comprising, a rigid supporting frame including a base, a shock tester carriage for said apparatus, means mounting said carriage on said frame for constrained rectilinear movement relative to said base under the urging of gravity, a specimen carrier operably associated with said carriage and adapted to contain the object to be tested, an impact anvil in the path of movement of said carriage against which said carriage is urged to move and to rebound therefrom as a result of said impact, and normally inactive flexible stop means on said carriage including oppositely extending integral portions adapted to frictionally engage said carriage mounting means during rebound movement of said carriage, means operatively associated with said stop means for maintaining said flexible stop means in its normally inactive condition and responsive to the impact shock between said carriage and said anvil for releasing said stop means thereby activating said stop means to grip said carriage mounting to abruptly stop said carriage at the peak of its rebound movement.

2. Impact shock testing apparatus comprising, an anvil, a shock tester carriage including means for mounting a specimen to be tested thereon, guide means for said carriage permitting said carriage to move therealong under the urging of gravity into striking engagement with said anvil, means to releasably support said carriage against the force of gravity out of contact with said anvil, a deflectable stop member carried by said carriage and including portions disposed at each end thereof straddling the associated guide means and operably engageable therewith, and means associated with said carriage for maintaining the said end portions of the stop member in non-engaging positions relative to said guide means, said stop member being responsive to the impact shock between said carriage and said anvil upon release of said means releasably supporting said carriage to move said stop member relative to said guide means whereby said stop member is deflected so as to bring the said end portions straddling the guide means into stopping engagement with said guide means thereafter halting the movement of said carriage.

3. Impact shock testing apparatus comprising, an impact anvil, an impact shock tester carriage, guide means straddling said anvil operably associated with said carriage for guiding the same toward and away from said anvil, means releasably mounting said carriage against the force of gravity adjacent said anvil, flexible means disposed on said carriage having oppositely disposed deflectable ends adapted to frictionally contact said guide means, and means for maintaining the deflectable ends of said flexible means out of contact with said guide means permitting said carriage when released to move therealong under the force of gravity into impact with said anvil, said last means being responsive to said impact to condition said flexible means whereby said deflectable ends frictionally contact said guide means causing said carriage to stop after rebounding from said anvil.

4. Impact shock testing apparatus in accordance with claim 3 wherein said guide means comprises confronting parallel rail members and wherein each of said deflectable ends of said flexible means is provided with a slot whereby said flexible means is operably slidably engageable with said rails.

5. Impact shock testing apparatus comprising, a rigid supporting frame including a base, a shock tester carriage for said apparatus, means mounting said carriage on said frame for constrained rectilinear movement relative to said base under the urging of gravity, a specimen carrier operably associated with said carriage and adapted to contain the object to be tested, an impact anvil in the path of movement of said carriage against which said carriage is urged to move by gravity and to rebound therefrom as a result of said impact, normally inactive stop means on said carriage adapted to frictionally engage said carriage mounting means during rebound movement of said carriage, means operatively associated with said stop means and responsive to the impact shock between said carriage and said anvil for releasing said stop means thereby conditioning said stop means to grip the carriage mounting means thus to abruptly stop said carriage at the peak of its rebound movement and switch means operably associated with said carriage and said anvil and including means connectible to indicating means for indicating the impact forces developed between said carriage and said anvil.

6. Impact shock testing apparatus comprising, a base, a supporting frame disposed on said base rising vertically upwardly therefrom and including a horizontal cross frame member attached therebetween, a pair of parallel spaced apart guides extending vertically between said base and said cross frame member, a shock tester carriage including an upper and a lower assembly operatively interconnected for conjoint movement, a first pair of oppositely disposed guide members operatively associated with said upper assembly for guiding said carriage along said parallel guides, and a normally inactive flexible stop member having opposite deflectable end portions engageable with said parallel guides, a second pair of oppositely disposed guide members operatively associated with said lower assembly for guiding said carriage along said parallel guides, said lower assembly also including a specimen carrier and an impact member, an upstanding anvil disposed on said base in the path of movement of said carriage and straddled by said parallel guides, means to restrain said carriage away from said anvil against the force of gravity, oppositely disposed detachable means engageable with said first guide members and the ends of said stop member for maintaining the latter inactive, said last means upon release of said carriage being responsive to the impact between said carriage impact member and said anvil for activating said stop member to abruptly stop said carriage at the peak of its rebound from said anvil.

References Cited in the file of this patent

UNITED STATES PATENTS

| | | |
|---|---|---|
| 1,901,460 | Lewis | Mar. 14, 1933 |
| 2,662,392 | Sullivan | Dec. 15, 1953 |
| 2,740,286 | DeVost et al. | Apr. 3, 1956 |
| 2,767,573 | DeVost et al. | Oct. 23, 1956 |

FOREIGN PATENTS

| | | |
|---|---|---|
| 228,710 | Germany | May 12, 1909 |